United States Patent Office 3,217,045
Patented Nov. 9, 1965

3,217,045
PRODUCTION OF PENTAERYTHRITOL TRICHLOROHYDRIN
Gerald Neubauer, Ludwigshafen (Rhine), and Matthias Seefelder, Ludwigshafen (Rhine), Gartenstadt, Germany, assignors to Badische Anilin- & Soda-Fabrik Aktiengesellschaft, Ludwigshafen (Rhine), Germany
No Drawing. Filed Sept. 12, 1961, Ser. No. 137,515
Claims priority, application Germany, Sept. 17, 1960, B 59,414
The portion of the term of the patent subsequent to Jan. 14, 1981, has been disclaimed
4 Claims. (Cl. 260—633)

This invention relates to a process for the production of pentaerythritol trichlorohydrin. More particularly it relates to a process for the production of pentaerythritol trichlorohydrin from pentaerythritol and hydrogen chloride in the presence of a solvent which enables the process to be carried out at a low pressure, such as atmospheric pressure.

Only a few processes are available for the production of pentaerythritol trichlorohydrin and these are usually complicated or can be carried out only with considerable technical difficulties.

It is known, for example, that by heating pentaerythritol together with concentrated hydrochloric acid at 120 to 185° C. in a bomb, mixtures of pentaerythritol mono-, di- and trichlorohydrins are obtained from which trichlorohydrin can be isolated.

According to German patent specification 955,233, trichlorohydrin is obtained in a 68% yield by reaction of pentaerythritol with hydrogen chloride at 150 to 200° C. in the presence of at least 0.1 mole of a lower aliphatic carboxylic acid or ester. It has been found that this process does not proceed in the manner specified unless elevated pressures are applied. The process is difficult to carry out on a commercial scale on account of the aqueous hydrochloric acid which forms during the reaction and which has a highly corrosive effect under the conditions applied.

The known reactor materials on carbon basis which are resistant to hydrochloric acid at the temperatures applied do not withstand the necessary pressures. Other materials, such as tantalum, are resistant at the pressures required, but extremely expensive, so that economy of the process for the production of pentaerythritol trichlorohydrin cannot be achieved.

Another known process in which pentaerythritol is reacted in pyridine with an excess of thionyl chloride is also fairly difficult to carry out and gives unsatisfactory yields. Moreover, it is uneconomical by reason of the high consumption of thionyl chloride.

Furthermore, several processes are known, according to which esters of pentaerythritol are first prepared which are then reacted with hydrogen chloride to pentaerythritol chlorohydrin esters, from which pentaerythritol trichlorohydrin can be obtained by reaction or saponification.

It is an object of this invention to provide a process for the production of pentaerythritol trichlorohydrin in good yields. It is another object of the invention to provide a process for the production of pentaerythritol trichlorohydrin which does not require an expensive solvent. Yet another object of the invention is to provide a process according to which pentaerythritol trichlorohydrin can be obtained in a one-stage process. It is a further object of the invention to provide a one-stage process for the production of pentaerythritol trichlorohydrin in which hydrogen chloride is used as the chlorinating agent and which lends itself to industrial-scale operation.

In accordance with the invention, these objects and advantages are achieved by reacting pentaerythritol at a temperature between about 170° and 200° C. with hydrogen chloride while using a reaction product derived from pentaerythritol and hydrogen chloride as solvent for the pentaerythritol.

The reaction is represented by the following scheme:

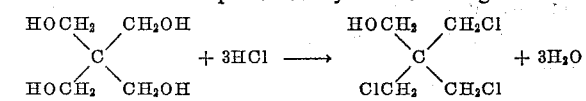

According to the new process good results are achieved not only with pure pentaerythritol but also with the commercial-grade reaction mixtures obtained by the reaction of acetaldehyde with formaldehyde, these latter containing up to 15% by weight (as a rule, 10 to 15% by weight) of dipentaerythritol.

Reaction products of pentaerythritol with hydrogen chloride which are suitable as solvents include pentaerythritol monochlorohydrin, pentaerythritol trichlorohydrin and especially pentaerythritol dichlorohydrin. None of these compounds need be used in pure form.

Mixtures of the said compounds are also useful, as are the reaction products obtained by the action of hydrogen chloride on pure or commercial-grade pentaerythritol at a temperature below 170° C., said products consisting mainly of pentaerythritol dichlorohydrin. 5,5-di-chlormethyl-dioxane-1,3, which is obtained as a byproduct when reacting commercial-grade pentaerythritol with hydrogen chloride, is also a suitable solvent. It is preferred to use the solvents and the pentaerythritol in a ratio by weight of about 1:1 up to 100:1.

By the coemployment of the said solvents for pentaerythritol it is possible to carry out the reaction at normal pressure and in the absence of fatty acids. It is thus possible to use cheap and stable reactor materials. At the same time, the difficulties which occur in the working up of the reaction mixture when a catalyst has been coemployed are avoided. The success of the reaction according to the present process is surprising in view of the fact that in "Die Praxis des organischen Chemikers" (The Practice of the Organic Chemist), 32nd edition (1947), pages 91 and 92, Gattermann states that the reaction of primary alcohols with hydrogen chloride only takes place under pressure or in the presence of a dehydrating agent. It is believed that the favorable effect of the solvents according to the invention is at least partly due to the fact that the starting compound, pentaerythritol, is dissolved, so that only one liquid phase is formed.

Although working under atmospheric pressure is the most convenient method it should be noted that working at a moderately elevated pressure is also possible. We prefer to carry out the process in such a way that the column of liquid consisting of solvent and pentaerythritol is under atmospheric pressure and the stream of hydrogen chloride to be passed through the column of liquid is introduced at a pressure as high as the hydrostatic pressure of the column of liquid or somewhat higher, e.g. up to 100 mm. Hg. It is also possible to carry out the process when the column of liquid itself is under a high pressure. The upper limit for the pressure is determined by the mechanical stability of the chemically resistant materials used for the reaction vessels (preferably graphite-containing materials). Pressures of up to about 5 atmospheres are applicable.

The hydrogen chloride is used in at least the amount theoretically necessary, but advantageously in an excess, the actual amount depending on the embodiment of the process chosen. As it flows through the reaction mixture the hydrogen chloride entrains with it the water of reaction and part of the reaction product. If the stream of hydrogen chloride, after separation of the liquid constituents entrained therewith, is returned to the process, the theoretical amount of hydrogen chloride is usually sufficient. Circulating the hydrogen chloride in this way is also recommendable because the vapor pressure of the pentaerythritol dichlorohydrin used as solvent is quite considerable even at room temperature and great difficulty is experienced in achieving complete removal of the pentaerythritol dichlorohydrin from the gas stream.

The reaction period depends mainly on the reaction temperature, the speed at which the hydrogen chloride is supplied and the extent to which the two phases of the reaction mixture are mixed. The reaction period is short when mixing is thorough.

The reaction requires a period of about 20 hours. If the reaction period is shorter, the amount of pentaerythritol trichlorohydrin is less, while longer reaction periods improve the yield of pentaerythritol trichlorohydrin somewhat. 50 Hours may be regarded as the upper limit. Obviously, the reaction period depends to a considerable extent on the reaction conditions. For example, when using suitably arranged reaction tubes that ensure a high level of liquid the period may be substantially reduced.

The process according to this invention may be carried out batchwise or continuously. One batch method, for example, consists in heating the pentaerythritol and the solvent to the reaction temperature and then supplying the desired amount of hydrochloride, advantageously in fine dispersion. It is also possible to begin the supply of hydrogen chloride while the pentaerythritol and the solvent are still being heated up. The most favorable reaction temperature lies between 170° and 200° C. When lower temperatures are applied, the chlorination comes to a standstill at the pentaerythritol dichlorohydrin stage, while partial decomposition of the reaction products occurs when higher temperatures are used.

For continuous operation of the process, the hydrogen chloride and the mixture of solvent and pentaerythritol may, for example, be passed in countercurrent through a vertical reaction tube that may be provided with baffles to prevent back mixing. It is especially advantageous to combine the production of the pentaerythritol dichlorohydrin serving as solvent with the production of the pentaerythritol trichlorohydrin by carrying out the reaction in a plurality of reaction vessels in series arrangement. In the first reaction vessel, the pentaerythritol, preferably dissolved in dichlorohydrin, is subjected at a temperature of 130° to 170° C. to a careful chlorination up to about the dichlorohydrin stage. The reaction to the trichlorohydrin is effected at a temperature of 170° to 200° C. in the subsequent reaction vessels. Partial decomposition of the pentaerythritol which occurs at about 200° C. is thus avoided. Pentaerythritol dichlorohydrin is stable at the said temperature.

The crude product obtained is worked up by vacuum distillation.

Pentaerythritol trichlorohydrin is a valuable initial material for the production of plastics, for example, polyethers. Plastics prepared therewith are distinguished by exceptional dimensional stability and resistance to chemicals. The said substance is moreover suitable as a chain stopper for polyesters. Valuable insecticides can also be prepared from pentaerythritol trichlorohydrin.

Example 1

4 kg. of technical-grade pentaerythritol in 12 kg. of pentaerythritol dichlorohydrin is charged to a glass reaction tube 10 cm. in diameter and 2 m. long which is provided with an internal circulation tube and which has been heated to 195° C. from outside. About 1000 g. per hour of hydrogen chloride is supplied into the tube from the bottom. The liquid is vigorously agitated by the gas stream and the gaseous and liquid phases are intimately mixed. The excess hydrogen chloride is returned, together with the water formed during the reaction and some entrained reaction product, to the reaction tube via a separator and a plurality of wash bottles charged with concentrated hydrochloric acid. The reaction is discontinued after 20 hours and the product combined with the portion collected in the separator and distilled. 12.6 kg. of trichlorohydrin is obtained besides 4.4 kg. of dichlorohydrin. This yield corresponds to 70% of the theory if it is assumed that all of the present pentaerythritol and of the pentaerythritol dichlorohydrin is converted into pentaerythritol trichlorohydrin and the pentaerythritol was 85% pure.

Example 2

The reactor consists of a 1 m. lower glass tube and a 2 m. upper glass tube, both having a diameter of 10 cm. The two glass tubes are connected by two glass tubes provided with taps and incorporate internal circulation tubes. The upper reaction tube is heated to 170° to 175° C. and the lower tube to 195° to 200° C. At the beginning of the reaction, the two tubes are charged with a total of 18 kg. of pentaerythritol dichlorohydrin. The upper tube is furthermore charged with 5 kg. of technical-grade pentaerythritol (content of monopentaerythritol 80 to 85%) which dissolves in the dichlorohydrin. 1000 g. per hour of hydrogen chloride is charged into the lower reaction tube. The hydrogen chloride mixes with the liquid. The excess hydrogen chloride passes from the lower reaction tube through the connecting tubes into the upper reaction tube. Care is to be taken that the liquid in the lower tube does not mix with the content of the upper tube. By the stream of hydrogen chloride, the liquid is vigorously mixed also in the upper reaction tube.

The unreacted hydrogen chloride, the reaction water formed and some entrained reaction product are passed through a cooler, a separator and wash bottles. The hydrogen chloride is supplied to a gasometer, in which a certain level is maintained by continuously adding make-up. From the gasometer, a gas pump feeds the hydrogen chloride through the reaction system.

In the upper reaction tube, several reactions proceed simultaneously: Pentaerythritol is reacted to pentaerythritol dichlorohydrin. The latter is converted into pentaerythritol trichlorohydrin, though only to a minor extent, the reaction proceeding but slowly at a temperature of 170° to 175° C. From the upper tube a reaction mixture is therefore obtained which consists essentially of pentaerythritol dichlorohydrin and contains only small amounts of pentaerythritol trichlorohydrin. The main process occurring in the lower tube is the conversion of pentaerythritol dichlorohydrin into pentaerythritol trichlorohydrin.

After 24 hours, about 5 kg. of reaction product consisting essentially of pentaerythritol trichlorohydrin is withdrawn. About 5 kg. of product consisting essentially of pentaerythritol dichlorohydrin is allowed to flow from the upper tube to the lower tube and 5 kg. of pentaerythritol charged to the upper tube.

The reaction can be continued in this way for any length of time. The crude product is combined with the product from the separator and distilled in vacuo. When the reaction is continued for a sufficiently long period and stationary conditions have been set up, 5 kg. of technical pentaerythritol gives 4.2 kg. of pentaerythritol trichlorohydrin, boiling point 124° C./10 mm. Hg, melting point 63° to 65° C., besides about 1.1 kg. of pentaerythritol dichlorohydrin which may be used again, 0.4 kg. of 5,5-dichloromethyldioxane-1,3 and 0.9 kg. of products of higher boiling point.

We claim:

1. A process for the production of pentaerythritol trichlorohydrin which comprises passing hydrogen chloride at a temperature between 170° C. and 200° C. and a pressure of between atmospheric pressure and about 5 atmospheres through pentaerythritol which is initially dissolved in a solvent selected from the group consisting of pentaerythritol monochlorohydrin, pentaerythritol dichlorohydrin and pentaerythritol trichlorohydrin and mixtures thereof for a reaction period of approximately 20 to 50 hours.

2. A process for the production of pentaerythritol trichlorohydrin which comprises passing hydrogen chloride at a temperature between 170° C. and 200° C. and a pressure of between atmospheric pressure and about 5 atmospheres through pentaerythritol which is initially dissolved in pentaerythritol dichlorohydrin for a reaction period of approximately 20 to 50 hours.

3. A process as claimed in claim 1 in which the effluent hydrogen chloride, after condensation of the entrained substances which are liquid under standard conditions, is recirculated.

4. A process as claimed in claim 1 in which a pentaerythritol of 85% purity is used.

References Cited by the Examiner
UNITED STATES PATENTS

| | | | |
|---|---|---|---|
| 2,257,899 | 10/41 | Britton et al. | 260—633 |
| 2,835,709 | 6/58 | Mann | 260—633 |
| 3,118,003 | 6/64 | Seefelder et al. | 260—633 |

OTHER REFERENCES

Fecht, Berichte, Deut. Chem., vol. 40, (1907), pp. 3888–3889.

LEON ZITVER, *Primary Examiner.*

CHARLES B. PARKER, *Examiner.*